United States Patent [19]
Van Ackere et al.

[11] Patent Number: 6,047,028
[45] Date of Patent: Apr. 4, 2000

[54] METHOD AND APPARATUS FOR FRAME MANIPULATION

[75] Inventors: Michel Van Ackere, Sint-Niklaas; Frank Octaaf Van Der Putten, Leest, both of Belgium

[73] Assignee: Alcatel, Paris, France

[21] Appl. No.: 08/963,791

[22] Filed: Nov. 4, 1997

[30] Foreign Application Priority Data

Nov. 4, 1996 [EP] European Pat. Off. .............. 96402335

[51] Int. Cl.$^7$ ...................................................... H04N 7/36
[52] U.S. Cl. .......................... 375/240; 348/384; 348/620; 348/415
[58] Field of Search .................................. 348/384, 390, 348/412, 415, 620; 375/240

[56] References Cited

U.S. PATENT DOCUMENTS

| | | | |
|---|---|---|---|
| 5,134,476 | 7/1992 | Aravind et al. | 348/415 |
| 5,231,484 | 7/1993 | Gonzales | 348/405 |
| 5,317,397 | 5/1994 | Odaka et al. | 348/416 |
| 5,361,105 | 11/1994 | Iu | 348/416 |

FOREIGN PATENT DOCUMENTS

| | | | |
|---|---|---|---|
| 0540961 | 5/1993 | European Pat. Off. | H04N 7/13 |
| 0614312 | 9/1994 | European Pat. Off. | H04N 5/21 |
| 0644696 | 3/1995 | European Pat. Off. | H04N 7/26 |
| 0700213 | 3/1996 | European Pat. Off. | H04N 7/24 |

*Primary Examiner*—Howard Britton
*Attorney, Agent, or Firm*—Ware, Fressola, Van Der Sluys & Adolphson LLP

[57] ABSTRACT

A method for generating an updated video stream from an incoming video stream for use in image encoding applications includes the steps of replacing each predetermined reference frame amongst a second plurality with an updated reference frame, obtained by temporal filtering of a first plurality of frames from said incoming video stream at positions dependent on the position of said each predetermined reference frame. If afterwards encoded using an encoding algorithm using the updated reference frames as reference frames, the thus encoded updated video stream will show a reduced peak-to-mean bitrate ratio compared to the encoded original video stream. An apparatus for performing this method is described as well.

8 Claims, 2 Drawing Sheets

METHOD AND APPARATUS FOR FRAME MANIPULATION

TECHNICAL FIELD

The present invention relates to a method for generating an updated video stream from an incoming video stream for use in image encoding applications and to an apparatus realising such a method.

BACKGROUND OF THE INVENTION

Such a method and apparatus are already known in the art, e.g. from the European Patent Application 94114620.1 "Method for temporal filtering of video signals using a motion adaptive spatial filter". In this document a motion-adaptive spatial filtering method and apparatus are presented, performing part of front-end processing on a video signal which needs to be encoded afterwards. The involved filtering steps serve to eliminate or to alleviate temporal noises and perform band limitation to thereby improve picture quality and encoding efficiency. The purpose of temporal filtering is to remove noise components in moving areas of successive frames, without affecting the details therein.

The filtered signal is then further encoded using e.g. standard MPEG-2 encoding techniques. This encoding method first identifies so-called reference frames in the video stream to be encoded, applies an intracoding algorithm to these reference frames, and further encodes the other frames differentially with respect to these reference frames. Even with the mentioned prior art front-end processing, the resulting bitstream after MPEG-2 encoding remains very bursty, resulting in a high peak-to-mean bitrate ratio of the encoded updated video stream. This high peak-to-mean bitrate ratio creates a serious problem for transmitting these encoded data using ATM transfer capabilities. This problem could be alleviated by over-dimensioning the ATM-network, or by using a flattening MPEG transport stream, in which the encoded updated video elementary stream is packetised into a packet elementary stream, and further integrated into a transport stream consisting of fixed length packets. This solution results in an inefficient use of the network, since a lot of these fixed length packets will contain useless bits.

SUMMARY OF THE INVENTION

An object of the present invention is to provide a method for generating an updated video stream from an incoming video stream for use in image encoding applications of the above known type, but which is such that, after encoding the updated video stream in accordance to a particular encoding scheme using reference frames, the encoded updated video stream shows reduced burstiness, such that it is directly suited for transmission over an ATM service network.

According to the invention, this object is achieved by a method for generating an updated video stream from an incoming video stream for use in image encoding applications, the method including the step of replacing a frame of the incoming video stream, with an updated frame, obtained by temporal filtering of a first plurality of frames from the incoming video stream at positions dependent on the position of the frame, wherein the frame is obtained by the additional first step of selecting a second plurality of predetermined reference frames, wherein for each predetermined reference frame amongst the second plurality, the step of updating and replacing is performed, thereby generating an updated reference frame related to the each predetermined reference frame, wherein the updated reference frame is used during further video encoding of the updated video stream as a reference frame for the encoding method, the updated video stream being generated as the incoming video stream with each predetermined reference frame replaced by the updated reference frame related to the each predetermined reference frame.

This object is also achieved by an apparatus adapted to generate an updated video stream from an incoming video stream for use in image encoding applications, the apparatus including at least one input terminal adapted to receive successive frames of the incoming video stream; selection means coupled to the input terminal and adapted to select from the incoming video stream, a first plurality of frames, upon control of a first control signal; temporal filter means coupled to the selection means and adapted to perform temporal filtering of the first plurality of frames, thereby generating an updated frame; replacing means coupled to the temporal filter means and adapted to replace, upon control of a second control signal, a frame of the incoming video stream with the updated frame, thereby generating a frame of the updated video stream; an output terminal, coupled to the replacing means and adapted to deliver successive frames of the updated video stream; and control means adapted to generate the first control signal, and the second control signal, based on first predetermined information including the relationship between the positions of the frames amongst the first plurality and the position of the frame to be replaced, wherein the control means is further adapted to generate the first control signal and the second control signal from second predetermined information, including positions of predetermined reference frames, included in a second plurality of predetermined reference frames, in that the replacement means is further adapted to replace a predetermined reference frame included within the second plurality of predetermined reference frames, in that the temporal filter means is further adapted to generate an updated reference frame related to the predetermined reference frame included in the second plurality, the updated reference frame thereby generated for use as a reference frame during further encoding of the updated video stream, the updated video stream thereby consisting of the incoming video stream so that each predetermined reference frame is replaced by the updated reference frame related to each predetermined reference frame.

In this way the updated video stream will only contain updated reference frames, whereas the non-reference frames therein have not changed with respect to the original video stream. The updated reference frame, generated by temporal filtering of a first plurality of frames, will deviate from the original reference frame to an extent which depends on the frame evolution over time. Indeed, the faster successive frames in the original video stream change over time, the more the updated reference frame will be different from the original reference frame. The updated reference frame will therefore be discontinuous in the sequence of successive frames in the updated video stream, meaning that non-reference frames in the vicinity of these updated reference frames will deviate much more from the newly generated reference frame than they did from the original reference frame. Consequently, further encoding non-reference frames with respect to these updated reference frames will result in substantially more bits required for these non-reference frames, reducing the peak-to-mean bitrate ratio of the encoded updated video stream.

An additional characteristic feature of the present invention is that said method includes a further spatial filtering step and that said apparatus further includes spatial filter means.

In order to further decrease the already reduced peak-to-mean bitrate ratio of the encoded updated video signal, an optional spatial filtering step is performed during generation of the updated reference frame. This spatial filtering step further reduces the bitcount needed for encoding the reference frame, which is also beneficial for reducing the mean bitrate of the encoded signal.

Another characteristic feature of the present invention is that said temporal filtering step is performed in accordance with a plurality of temporal filter parameters, whereby the value of each of the temporal filter parameters is dependent on the first plurality of frames, and that the part of the apparatus realising said temporal filtering step is controlled by a plurality of temporal filter parameters, generated with a first control unit, included in the apparatus, the first control unit being adapted to receive the first plurality of frames of the incoming video steam, and to calculate therefrom the value of the temporal filter parameters according to a first predetermined algorithm, the value of the temporal filter parameters being output signals of the first control unit.

This means that the temporal filtering step is made dependent upon the content and the content evolution of these frames in the original video stream that are selected and used for generating the updated reference frame. When the selected frames are considerably different from each other, an adaptive temporal filtering step giving more relative importance to these frames deviating the most from the original reference frame, will in general result in an updated reference frame deviating more from the neighbouring frames compared to a temporal filtering step in which all selected frames are give a fixed weight. Therefore the burstiness of the afterwards encoded updated video stream will be reduced again. Thus temporal filtering using temporal filter parameters that are variable in function of the content and the content evolution of the frames selected for performing this temporal filtering step on, is much more effective for reducing the burstiness of the afterwards encoded signal, than a temporal filtering step with pre-defined constant weighing or filter parameters.

Another characteristic feature of the present invention is that said spatial filtering step is performed in accordance with a plurality of spatial filter parameters, wherein the value of each of the spatial filter parameters is dependent on the first plurality of frames, and that the part of the apparatus performing said spatial filtering step is where the spatial filter means is controlled by a plurality of spatial filter parameters, generated within a second control unit included within the apparatus, the second control unit being adapted to receive the first plurality of frames of the incoming video stream and to calculate therefrom the value of the spatial filter parameters according to a second predetermined algorithm, the value of the spatial filter parameters being output signals of the second control unit.

In case the frames selected and used for generating the updated reference frame are nearly identical and resemble the original reference frame, the previously mentioned temporal filtering step will result in nearly the same original reference frame, even if an adaptive temporal filtering step is used. In this case the peak-to-mean bitrate ratio of the encoded updated signal can only be reduced by a spatial filtering step. By then making this spatial filtering step adaptive on the content of the selected frames itself, in this sense that images with high frequency spatial content will be filtered more than the images with low spatial frequency content, and by relatively more filtering spatial content information related to the original reference frame, the updated reference frame, reduced in bitcount with respect to the original one, will also be more deviating from the neighbouring frames than did the original one, thus again decreasing the peak-to-mear bitrate ratio of the afterwards encoded updated signal.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

The method subject of the invention is a pre-processing method for generating an updated video stream from an incoming video stream, prior to delivering this updated video stream to a video encoder. This updated video stream being such that, if afterwards input to an encoding apparatus realising an encoding method making use of reference frames, such as for instance the well-known MPEG-2 encoding method, the resulting encoded updated video stream is less bursty than an encoded non-updated video stream.

Figure 1:
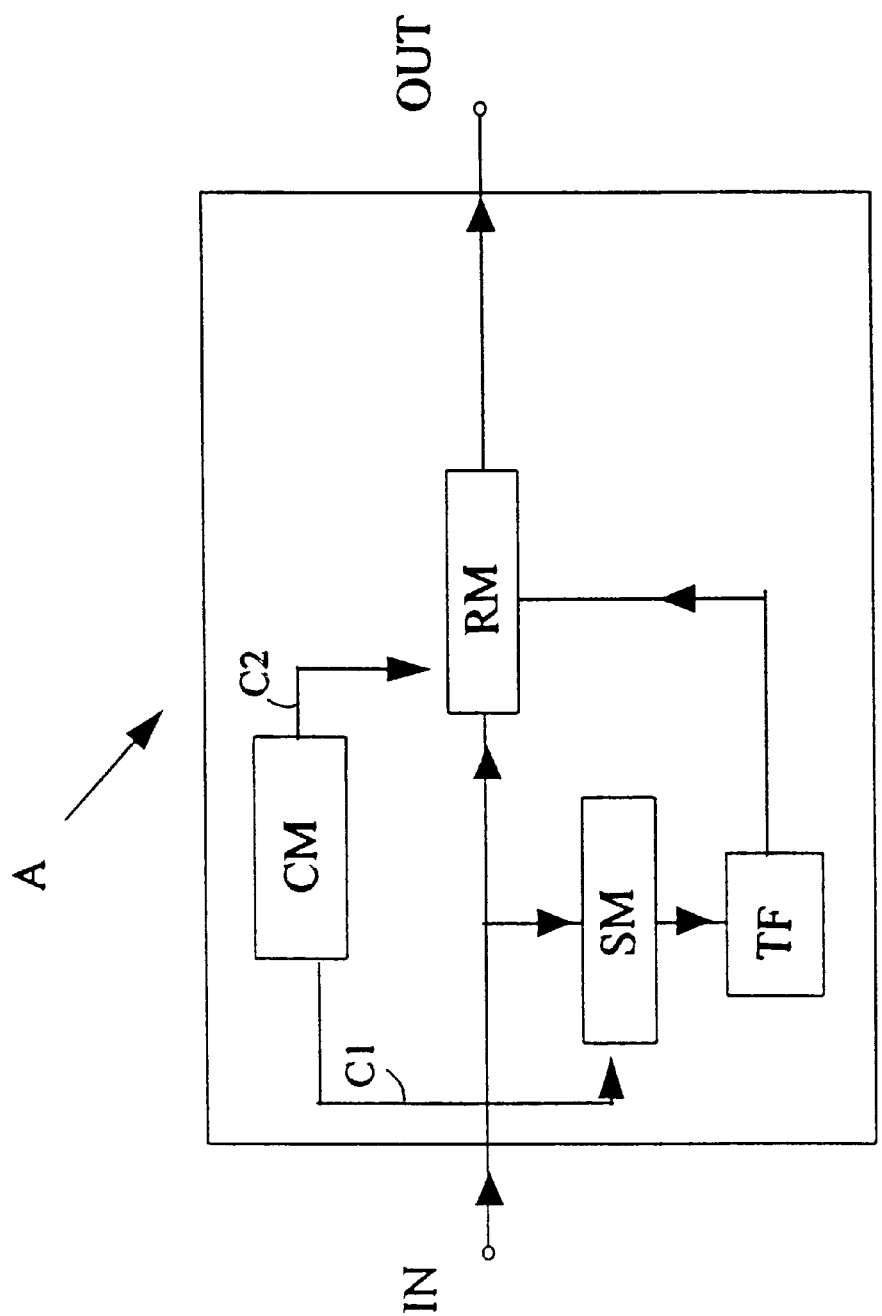
FIG. 1 shows a block scheme of an apparatus according to the invention.

The method therefore generates an updated set of reference frames, replacing the original reference frames. FIG. 1 depicts a block scheme of an apparatus A adapted to realise such a method. The incoming video stream is received in the apparatus A via an input terminal IN. The positions of the reference frames, as chosen by the encoding apparatus during the encoding procedure, are known by a control means CM as second predetermined information, for instance programmable during start up. This control means CM forms part of the apparatus A and generates a first control signal, C1, based on this second predetermined information, and on first predetermined information, including information about the positions of the frames of a first plurality, to be selected from the original video stream for generating one particular updated reference frame. In general this first predetermined information includes the relative positions of the frames of the first plurality to be selected, with respect to the position of the reference frame to be updated. For example, for a particular reference frame in the original video stream, the frames of the first plurality to be selected can consist of this reference frame itself, two reference frames following and two reference frames preceding this reference frame. The second predetermined information then includes the positions of the reference frames, or an algorithm to calculate these positions, whereas the first predetermined information includes the relative positions of the frame to be selected per reference frame, in this example being the position of the reference frame itself, the positions of the two reference frames preceding and the two reference frames following the reference frame under consideration, or an algorithm to calculate these positions. As is the case for the second predetermined information, the first predetermined information can be programmable during start up.

The control means CM delivers this first control signal C1 to a selection means SM. This selection means SM, also included in the apparatus, is adapted to select, for each reference frame from the incoming video stream to be updated, a first plurality of frames, the position of these selected frames of this first plurality, thus being dependent on the position of the reference frame to be replaced, as indicated by the first control signal C1.

Such a selection means SM, in some embodiments of the apparatus, may therefore include a large memory to store large amounts of incoming and/or selected frames, depending on the particular selection criterion. How to implement such a selection means is however commonly known by a person skilled in the art, and will therefore not be further described.

After having selected this first plurality of frames, a temporal filtering step is performed on them by a temporal filter means TF. Temporal filtering has to be understood in the most general way as to use the motion information contained within the frames included in this first plurality, for generating an updated reference frame. In this sense, motion-adaptive spatial filtering also has to be considered as temporal filtering, as is well known by a person skilled in the art. Such and other temporal filter means have been described rather exhaustively in the literature. Possible embodiments consist of a series of parallel operating switches, each switch receiving one of the selected frames of the first plurality. For such embodiments of the temporal filter means, the image information pertaining to individual frames of the first plurality will flow between the selection means and the temporal filter means via a bundle of individual parallel links, each link connecting one individual switch of the temporal filter means TF. For these embodiments the connection between the selection means SM and the temporal filter means TF of FIG. 1, thus consists of a bundle of parallel links. The control of the switches can be fixed, or can be made variable upon the image content of the frames itself. The frames that are passed through the switches are then combined in a combining unit, also part of the temporal filter means, to generate one new image being the updated reference frame. However other embodiments are also possible and will not be further discussed here since these are well known to a person skilled in the art.

The updated reference frame is then forwarded to a replacement means RM, also included in the apparatus A. This replacement means also receives the incoming original video stream and replaces therein the original reference frames with the corresponding updated reference frames. To perform this latter function the replacement means RM is controlled by the control means CM, by means of a second control signal C2. This second control signal C2 informs the replacement means RM about the position of the original reference frames in the incoming video stream, whereby the replacement means can identify these frames and replace them with the corresponding updated ones, thereby generating successive parts of the updated video stream. The replacement means then passes these successive parts of the updated video stream to an output terminal OUT.

Again, depending on the positions of the reference frames to be replaced, several embodiments of the replacement means RM are possible. Since however implementing such a means, based on its functional description, is rather obvious to a person skilled in the art, the details of implementing such a replacement means will not be described here. It has to be remarked that, depending on the processing time needed by the temporal filter means, additional buffering memory (not shown) may be necessary in the replacement means, or in the apparatus in between the input terminal, the selection means, and the replacement means, to enable the apparatus to perform the method properly.

In this respect, attention must be further drawn to the fact that for proper and timely functioning of the apparatus, other control signals, provided by the control means CM and distributed to all functional blocks part of the apparatus, are necessary, although they are not shown in FIG. 1, nor further described here. A person skilled in the art is however familiar with these principles of operation and knows how to implement them. Since they are not relevant to the invention itself they will not be further described.

The output terminal OUT can be further coupled to a video encoding means (not shown) receiving the updated video stream for then encoding it, using the updated reference frames as reference frames during the encoding algorithm.

The method may optionally include a spatial filtering step, realised by a spatial filter means (not shown on FIG. 1). The purpose of this spatial filtering step is to further reduce the bitcount information of the updated frame, as generated by the temporal filter means. By this, the bitcount information of the updated reference frame can be reduced to well below the bitcount information of the original reference frame, thereby further reducing the peak-to-mean bitrate ratio of the encoded updated video stream, which is beneficial for transport over ATM-networks.

In one variant of the method, realised by one variant embodiment of the apparatus (not shown), the spatial filtering step is performed on the selected frames, before temporally filtering them. In this variant embodiment the spatial filtering means is coupled between the selection means and the temporal filter means. In another variant of the method the spatial filtering step is performed on the result of the temporal filtering step, this result being just one frame. This other variant of the method is realised by another variant embodiment of the apparatus (not shown) wherein the spatial filter means is coupled between the temporal filter means and the replacing means. In yet another embodiment of the apparatus realising a third variant of the method, both steps can be intermixed, in this sense that a part of the temporal filtering step is performed first on the individually selected frames of the first plurality, resulting in a set of intermediate temporally filtered frames, this step being followed by individually spatially filtering these intermediate frames, the result of which is then combined in a combining unit, included in the temporal filter means, for generating the updated reference frame.

Figure 2:
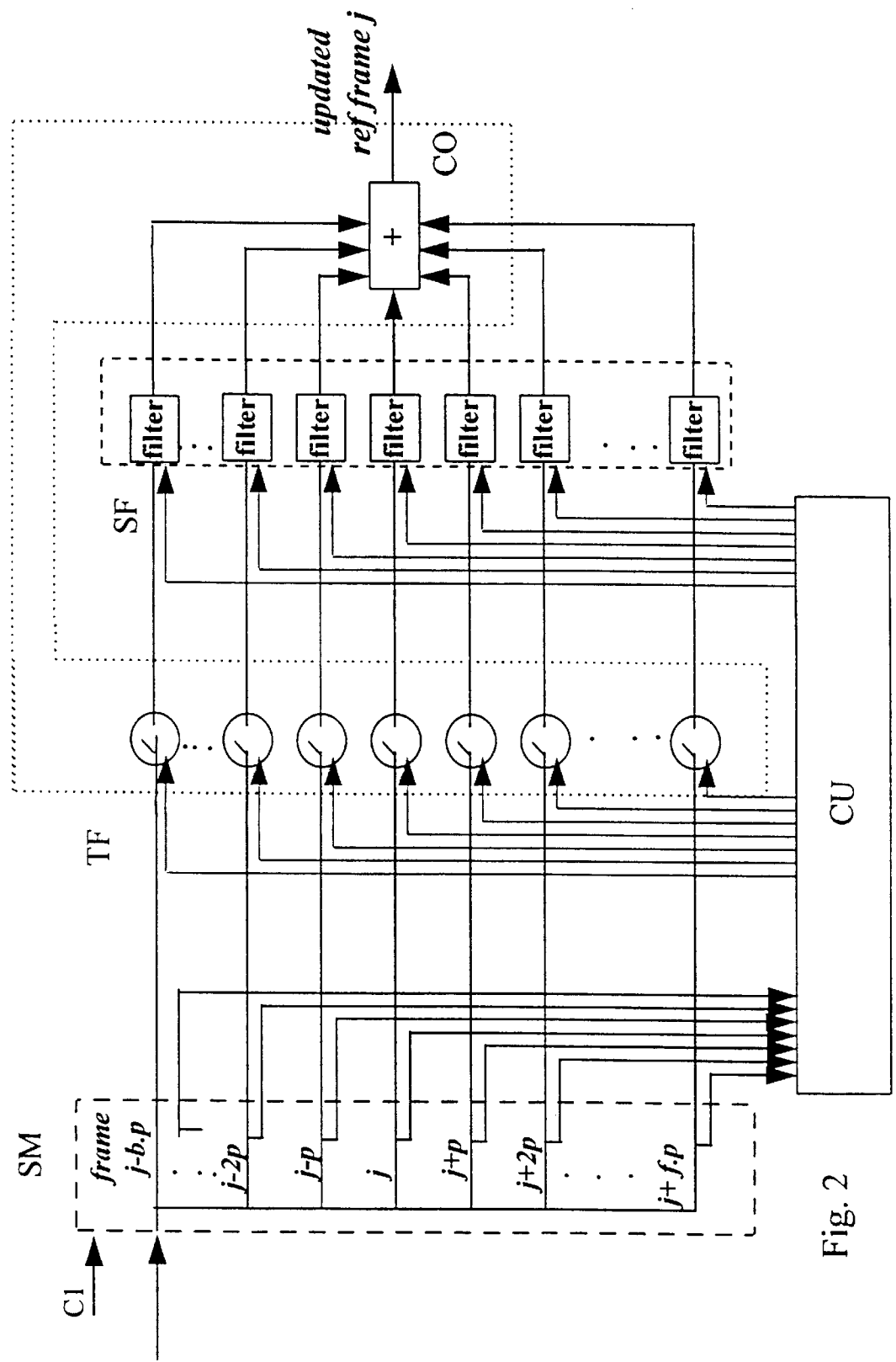
FIG. 2 shows part of an embodiment of the apparatus according to the invention.

This latter variant of the method is realised by an embodiment of the apparatus A, part of which is shown in FIG. 2. This figure functionally shows how to generate an updated reference frame, intended for replacing an original reference frame located in the original video stream at frame position j. In this embodiment the first plurality of frames, selected by the selection means SM from the incoming video stream, consists of the frames of the original video stream, located at frame positions j-bp, j-(b-1)p, . . . , j-2p,j-p,j, j+p, j+2p, . . . , j+fp whereby p denotes the period between two successive original reference frames in the incoming video stream, and f and b are integer numbers indicating the amount of reference frames following and preceding reference frame j, that are to be taken from this incoming video stream. Note that in other embodiments, non-reference frames can be selected as well for generating the updated reference frame.

The selection means SM of this embodiment as shown in FIG. 2 receives successive frames from the original video stream, successively selects therefrom successive first pluralities of frames corresponding to the particular reference frames, and temporarily stores successive first pluralities of frames. For the reference frame at position j, the frames from positions j-bp, j-(b−1)p, ..., j−2p,j-p,j, j+p, j+2p, ..., j+fp are thus temporarily stored in its memory, before passing them in parallel to the temporal filter means TF. Also in this embodiment the connection between the selection means SM and the temporal filter means consists of a bundle of parallel links. This temporal filter means TF, in this embodiment of the apparatus, consists of an amount of switches, equal to the amount of frames contained in the selected first plurality. In this embodiment of the apparatus the control of the switches is variable and depends on the image content of the selected frames. This dependency is realised by means of a first control unit, in this embodiment being incorporated in a larger control unit CU. It should be noted that not all temporal filter means require such a control unit, which was therefore not added in FIG. 1 which only depicts a block scheme of the essential elements of apparatus according to the invention. Therefore the control signals generated in this control unit which are sent to the temporal filter means are also not shown in FIG. 1.

The first control unit receives the image content of the selected frames, and determines, according to a first predetermined algorithm or criterion, the control of the different switches. Such an algorithm may consist of comparing the image content of the selected frames with the original reference frame, determining the deviation with respect to the original reference frame, thereby giving more relative importance to the most deviating frames by closing the corresponding switches and by opening the others. It should be noted that other algorithms are also possible. The thus retained frames are subsequently sent to individual spatial filter means, all together composing a spatial filter means SF of this embodiment of the apparatus. All individual spatial filters are again controlled by means of separate spatial filter parameters, generated by a second control unit, in this particular embodiment again incorporated in the larger control unit CU. Based on the spatial image content of the selected frames, this control unit determines, (according to a second algorithm, the individual spatial filter parameters which control the individual spatial filters of the spatial filter means. Such an algorithm may consist in determining the high frequency spatial content of each of the difference images between the individual selected frames of the first plurality and the original reference frame, and adapting the transfer function of the individual filters such that the high frequency spatial content of the individual frames is separately reduced, whereby the most deviating frames are given a less rough spatial filtering than the least deviating ones, thereby again enhancing the difference between the updated reference frame with the neighbouring non-reference frames. This again reduces the burstiness of the afterwards encoded updated video signal.

In this particular embodiment of the apparatus the control of both spatial and temporal filter means is even made dependent on each other, realisable by the fact that both spatial and temporal filter control parameters are calculated in one control unit CU, as is depicted in FIG. 2. Such an embodiment allows the updated video stream to be optimised for burstiness reduction, while maintaining the highest possible quality level at yet reasonable low mean bit rate. This can be understood from two extreme examples from incoming video streams: one video stream with nearly identical selected frames, and a second incoming video stream with selected frames that are seriously different. In the first case there is little gain in replacing the original reference frame with a weighted average over time of these selected frames. An appropriate weak spatial filtering step on the original reference frame, adapted by the control unit to not visibly deteriorate the original video stream quality, while still reducing that reference frame's high frequency content, is the most obvious solution for generating the updated reference frame. This however requires the interdependent control of both filters. In the case of seriously different selected successive frames, the most deviating ones should be given a higher weighing factor for the newly generated reference frame than the least deviation ones. As most energy is concentrated here in the time evolution of the original video stream, additional strong spatial filtering can be applied in the generation of the new reference frame, with little visible deterioration of the original video stream quality, this however again requiring the interdependency in the control of both filters. In both cases, the final result will be that non-reference frames in the vicinity differ much more from tie updated reference frame than they did from the original reference frame, thus reducing the burstiness after encoding. Besides this, the bitcount information of the newly generated reference frame will not be higher than the bitcount of the original reference frame, at yet high quality as is determined by the control unit by controlling all filter parameters interdependently.

The frames that are passed through the switches and underwent a spatial filtering, are then combined in a combining unit, CO, included in the temporal filter means TF, to generate one updated reference frame at position j. This updated reference frame at position j is subsequently sent to the replacing means which will then further replace the original reference frame at position; by the updated reference frame at position j, and perform the same function on all other reference frames, as previously described.

Of course, this embodiment requires the most processing power, and is more complex, compared to an embodiment with fixed filter control parameters, or with spatial and temporal filter parameters that are not interdependent.

If required, the new image sequence can again be fed in as input to compute a second iteration new image sequence, as part of an iterative procedure.

From this description it becomes clear that such an apparatus A updates the incoming video stream off-line, since, depending on the first plurality of frames to be selected, rather important memory and processing power may be needed.

The described apparatus can be implemented in hardware or in software, or may employ a combination of both to enhance performance and flexibility.

While the principles of the invention have been described above in connection with specific apparatus, it is to be clearly understood that this description is made only by way of example and not as a limitation on the scope of the invention.

We claim:

1. A method for generating an updated video stream from an incoming video stream for use in image encoding applications, said method including a step of replacing a frame of said incoming video stream, with an updated frame, obtained by temporal filtering of a first plurality of frames from said incoming video stream at positions dependent on the position of said updated frame, characterised in that said updated frame is obtained by selecting a plurality of predetermined reference frames, wherein for each predetermined reference frame, said step of replacing is performed, thereby generating an updated reference frame related to said each predetermined reference frame, wherein said updated reference frame is used during further video encoding of said updated video stream as a reference frame, said updated video stream being generated as said incoming video stream with said each predetermined reference frame replaced by said updated reference frame related to said each predetermined reference frame.

2. A method according to claim 1, characterised in that said method includes an additional step of spatial filtering during generation of said updated reference frame.

3. A method according to claim 1, characterised in that said temporal filtering step is performed in accordance with a plurality of temporal filter parameters, whereby the value of each of said temporal filter parameters is dependent on said first plurality of frames.

4. A method according to claim 2, characterised in that said spatial filtering step is performed in accordance with a plurality of spatial filter parameters, wherein the value of each of said spatial filter parameters is dependent on said first plurality of frames.

5. An apparatus (A) adapted to generate an updated video stream from an incoming video stream for use in image encoding applications, said apparatus (A) including
   at least one input terminal (IN) adapted to receive successive frames of said incoming video stream,
   selection means (SM) coupled to said input terminal (IN) and adapted to select from said incoming video stream, a first plurality of frames, upon control of a first control signal (C1),
   temporal filter means (TF) coupled to said selection means (SM) and adapted to perform temporal filtering of said first plurality of frames, thereby generating an updated frame,
   replacing means (RM) coupled to said temporal filter means (TF) and adapted to replace, upon control of a second control signal (C2), a frame of said incoming video stream with said updated frame, thereby generating a frame of said updated video stream,
   an output terminal (OUT), coupled to said replacing means and adapted to deliver successive frames of said updated video stream, and
   control means (CM) adapted to generate said first control signal (C1), and said second control signal (C2), based on first predetermined information including the relationship between the positions of the frames amongst said first plurality and the position of said frame to be replaced,
characterised in that
   said control means (CM) is further adapted to generate said first control signal (C1) and said second control signal (C2) from second predetermined information, including positions of predetermined reference frames, included in a second plurality of predetermined reference frames,
   in that said replacement means (RM) is thereby further adapted to replace a predetermined reference frame included within said second plurality of predetermined reference frames,
   in that said temporal filter means (TF) is further adapted to generate an updated reference frame related to said predetermined reference frame included in said second plurality,
   said updated reference frame thereby generated for use as a reference frame during further encoding of said updated video stream,
   said updated video stream thereby consisting of said incoming video stream so that each said predetermined reference frame is replaced by said updated reference frame related to said each predetermined reference frame.

6. An apparatus according to claim 5, characterised in that said apparatus further includes spatial filter means.

7. An apparatus according to claim 5, characterised in that said temporal filter means (TF) is controlled by a plurality of temporal filter parameters, generated with a first control unit, included in said apparatus, said first control unit being adapted to receive said first plurality of frames of said incoming video steam, and to calculate therefrom the value of said temporal filter parameters according to a first predetermined algorithm, the value of said temporal filter parameters being output signals of said first control unit.

8. An apparatus according to claim 6, characterised in that said spatial filter means is controlled by a plurality of spatial filter parameters, generated within a second control unit included within said apparatus, said second control unit being adapted to receive said first plurality of frames of said incoming video stream and to calculate therefrom the value of said spatial filter parameters according to a second predetermined algorithm, the value of said spatial filter parameters being output signals of said second control unit.

* * * * *

UNITED STATES PATENT AND TRADEMARK OFFICE
CERTIFICATE OF CORRECTION

PATENT NO : 6,047,028
DATED : April 4, 2000
INVENTOR(S) : Van Ackere et al.

It is certified that error appears in the above-identified patent and that said Letters Patent is hereby corrected as shown below.

In column 3, line 17, "steam" should read --stream--.

In column 10, claim 7, line 31, "steam" should read --stream--.

Signed and Sealed this

Sixth Day of February, 2001

Attest:

Attesting Officer

Q. TODD DICKINSON

Director of Patents and Trademarks